(12) United States Patent
Peterson et al.

(10) Patent No.: US 12,404,437 B2
(45) Date of Patent: Sep. 2, 2025

(54) FIBER REINFORCED FLEXIBLE FOAMS

(71) Applicant: L&P Property Management Company, South Gate, CA (US)

(72) Inventors: Bruce W. Peterson, West Lake Hills, TX (US); Mark L. Crawford, Alma, AR (US); Matthew D. McKnight, Barling, AR (US)

(73) Assignee: L&P Property Management Company, Carthage, MO (US)

( * ) Notice: Subject to any disclaimer, the term of this patent is extended or adjusted under 35 U.S.C. 154(b) by 0 days.

(21) Appl. No.: 17/736,411

(22) Filed: May 4, 2022

(65) Prior Publication Data

US 2022/0259478 A1 Aug. 18, 2022

Related U.S. Application Data

(63) Continuation of application No. 16/195,278, filed on Nov. 19, 2018, now Pat. No. 11,401,451.
(Continued)

(51) Int. Cl.
*C09K 5/14* (2006.01)
*C08G 18/48* (2006.01)
(Continued)

(52) U.S. Cl.
CPC ............... *C09K 5/14* (2013.01); *C08G 18/48* (2013.01); *C08J 9/0028* (2013.01); *C08J 9/0066* (2013.01);
(Continued)

(58) Field of Classification Search
CPC ............ C08G 18/48; C08G 2110/0008; C08G 2110/005; C08G 2110/0058;
(Continued)

(56) References Cited

U.S. PATENT DOCUMENTS 2,917,476 A 12/1959 Peterson et al.
3,483,069 A * 12/1969 Lindstrom .............. B29C 44/10
428/101
(Continued)

FOREIGN PATENT DOCUMENTS

CA 2769884 A1 3/2011
EP 0368274 A2 5/1990
(Continued)

OTHER PUBLICATIONS

Dhakate, S. R. et al., "Polymer Nanocomposite Foam Filled With Carbon Nanomaterials as an Efficient Electromagnetic Interference Shielding Material," RSC Advances, 2015, vol. 5, pp. 43036-43057.
(Continued)

*Primary Examiner* — Hai Vo
(74) *Attorney, Agent, or Firm* — Wood Herron & Evans LLP

(57) ABSTRACT

A flexible foam composition comprising a flexible foam structure comprising a plurality of struts, and a plurality of fibers, where a majority of the fibers are associated with the struts. The fibers may be thermally conductive fibers. The fibers include, but are not necessarily limited to, homopolymer and/or copolymer fibers having a glass transition temperature (Tg) of −50° C. (−58° F.) or greater, carbon fibers, animal-based fibers, plant-based fibers, metal fibers, and combinations thereof. The presence of fibers can impart to the flexible foam composition greater indentation force deflection (IFD), greater static thermal conductivity, improved compression set, improved height retention or durability, and/or a combination of these improvements. The flexible foam composition may be polyurethane foam, latex foam, polyether polyurethane foam, viscoelastic foam, high resilient foam, polyester polyurethane foam, foamed poly-
(Continued)

ethylene, foamed polypropylene, expanded polystyrene, foamed silicone, melamine foam, among others.

23 Claims, 3 Drawing Sheets

Related U.S. Application Data

(60) Provisional application No. 62/588,749, filed on Nov. 20, 2017.

(51) Int. Cl.
| | |
|---|---|
| C08J 9/00 | (2006.01) |
| C08K 3/04 | (2006.01) |
| C08K 3/08 | (2006.01) |
| C08K 7/06 | (2006.01) |
| C08K 9/02 | (2006.01) |
| C08K 9/04 | (2006.01) |
| C08L 75/04 | (2006.01) |

(52) U.S. Cl.
CPC .............. *C08J 9/0085* (2013.01); *C08K 3/04* (2013.01); *C08K 3/08* (2013.01); *C08K 7/06* (2013.01); *C08K 9/02* (2013.01); *C08K 9/04* (2013.01); *C08L 75/04* (2013.01); *C08G 2110/0008* (2021.01); *C08G 2110/005* (2021.01); *C08G 2110/0058* (2021.01); *C08G 2110/0066* (2021.01); *C08J 2205/06* (2013.01); *C08J 2207/10* (2013.01); *C08J 2375/04* (2013.01); *C08J 2405/08* (2013.01); *C08K 2003/085* (2013.01); *C08K 2003/0862* (2013.01); *C08K 2201/001* (2013.01); *C08K 2201/003* (2013.01); *C08K 2201/004* (2013.01); *C08L 2203/14* (2013.01); *C08L 2205/16* (2013.01); *Y10T 428/249954* (2015.04); *Y10T 428/249986* (2015.04)

(58) Field of Classification Search
CPC .......... C08G 2110/0066; C08J 2205/06; C08J 2207/10; C08J 2375/04; C08J 2405/08; C08J 9/0028; C08J 9/0066; C08J 9/0085; C08J 9/009; C08K 2003/085; C08K 2003/0862; C08K 2201/001; C08K 2201/003; C08K 2201/004; C08K 3/04; C08K 3/08; C08K 7/06; C08K 9/02; C08K 9/04; C08L 2203/14; C08L 2205/16; C08L 75/04; C09K 5/14; Y10T 428/249954; Y10T 428/249986
See application file for complete search history.

(56) References Cited

U.S. PATENT DOCUMENTS

| | | | |
|---|---|---|---|
| 4,160,076 A * | 7/1979 | Guthrie | C08G 18/4833 |
| | | | 521/905 |
| 4,683,246 A | 7/1987 | Davis et al. | |
| 5,855,818 A | 1/1999 | Gan et al. | |
| 6,232,354 B1 | 5/2001 | Tan | |
| 6,258,864 B1 | 7/2001 | Dalton et al. | |
| 6,299,246 B1 | 10/2001 | Tomka | |
| 6,605,343 B1 | 8/2003 | Motoi et al. | |
| 7,160,929 B1 | 1/2007 | Tan | |
| 9,097,011 B1 | 8/2015 | Barone et al. | |
| 11,401,451 B2 * | 8/2022 | Peterson | C08K 3/08 |
| 2002/0132106 A1 | 9/2002 | Dyer et al. | |
| 2003/0220039 A1 | 11/2003 | Chen et al. | |
| 2004/0235376 A1 | 11/2004 | Byma et al. | |
| 2005/0116379 A1 | 6/2005 | Goldsmith et al. | |
| 2006/0148917 A1 | 7/2006 | Radwanski et al. | |
| 2007/0042901 A1 | 2/2007 | Kurose et al. | |
| 2009/0292035 A1 | 11/2009 | Semmes | |
| 2010/0087115 A1 | 4/2010 | Davis et al. | |
| 2010/0174006 A1 | 7/2010 | Gilder et al. | |
| 2011/0006267 A1 | 1/2011 | Simpson et al. | |
| 2011/0006579 A1 | 1/2011 | Hannig et al. | |
| 2011/0014454 A1 * | 1/2011 | Yamamoto | C08J 9/12 |
| | | | 264/45.3 |
| 2012/0276339 A1 * | 11/2012 | Pearce | B32B 5/245 |
| | | | 156/247 |
| 2013/0130016 A1 | 5/2013 | Hodgson et al. | |
| 2014/0011903 A1 | 1/2014 | Bosnyak et al. | |
| 2014/0141161 A1 | 5/2014 | Bruchertseifer | |
| 2014/0183403 A1 | 7/2014 | Peterson et al. | |
| 2014/0329018 A1 | 11/2014 | Berrang | |
| 2016/0160059 A1 | 6/2016 | Anderson et al. | |
| 2016/0176076 A1 | 6/2016 | Henwood | |
| 2016/0264746 A1 | 9/2016 | Paulsen | |
| 2016/0280890 A1 | 9/2016 | Kumar et al. | |
| 2017/0037215 A1 | 2/2017 | Crawford et al. | |
| 2017/0067248 A1 | 3/2017 | Vairo et al. | |
| 2018/0044489 A1 | 2/2018 | Takehara et al. | |
| 2018/0292148 A1 | 10/2018 | Watanabe | |
| 2018/0355140 A1 | 12/2018 | Song et al. | |
| 2019/0145098 A1 | 5/2019 | Geyer et al. | |
| 2019/0202972 A1 | 7/2019 | Wu et al. | |

FOREIGN PATENT DOCUMENTS

| | | |
|---|---|---|
| EP | 2801464 A1 | 11/2014 |
| WO | 2014008259 A1 | 1/2014 |
| WO | 2014125367 A1 | 8/2014 |
| WO | 2017105459 A1 | 6/2017 |
| WO | 2017173396 A1 | 10/2017 |
| WO | 2018204911 A1 | 11/2018 |

OTHER PUBLICATIONS

European Patent Office; Supplementary European Search Report in related European Patent Application No. 18 87 8008 dated May 17, 2021; 6 pages.
George et al., "Hybrid Core Carbon Fiber Composite Sandwhich Panels: Fabrication and Mechanical Response," Composite Structures 108 (2014) 696-710.
Kholmanov, I., et al. "Continuous Carbon Nanotube-Ultrathin Graphite Hybrid Foams for Increased Thermal Conductivity and Supressed Subcooling in Composite Phase Change Materials," ACS Nano, Nov. 2015.
Ono et al., "Acoustic Characteristics of Undirectionally Fiber-Reinforced Polyurethane Foam Composites for Musical Instrument Soundboards," Acoust. Sci. & Tech 23, 3 (2002).
PCT/US2018/062058—International Search Report dated Mar. 19, 2019.
Shan, C. W. et al., "Study of Flexible Polyurethane Foams Reinforced with Coir Fibres and Tyre Particles," International Journal of Applied Physics and Mathematics, Mar. 2012, vol. 2, pp. 123-129.
Xu et al., Ultralight Conductive-Nanotube-Polymer Composite; Small 2007, No. 3, 408-411; 2007.
Rinkel, Bert, European Office Action in related European Patent Application No. 18 878 008 dated May 3, 2023, 4 pages, European Patent Office, Netherlands.

* cited by examiner

FIBER REINFORCED FLEXIBLE FOAMS

CROSS-REFERENCE TO RELATED APPLICATIONS

This application is a continuation of U.S. patent application Ser. No. 16/195,278 filed Nov. 19, 2018 (pending), which claims the benefit of priority to U.S. Provisional Patent Application No. 62/588,749 filed Nov. 20, 2017, incorporated herein by reference in their entirety.

TECHNICAL FIELD

The invention relates to compositions for flexible foams in which the struts within the foam are aligned with and/or associated with a plurality of fibers, and more particularly relates to flexible foam compositions where in non-limiting embodiments the flexible foams are polyurethane or latex foams and the fibers are carbon fibers, metal fibers, plant-based fibers, animal-based fibers, and/or synthetic fibers.

TECHNICAL BACKGROUND

Polyurethane foams are typically made from the reaction of one or more polyols with one or more isocyanates in the presence of gelation and blowing catalysts and other additives. They are used in a wide variety of industrial and household items ranging from interior components of airplanes and automobiles to residential appliances, furniture, bedding, and bath items.

Because of the wide ranging use of polyurethane foams, it is important for the foams to be durable, strong, less susceptible to deformation and degradation, and more thermally conductive.

Over the years, various additives and other materials have been incorporated into the polyurethane foam making process to improve their performance for the end uses of the foams. In addition, polyurethane and other foams have been subjected to different types of surface treatment to achieve the same, in a non-limiting embodiment having a substance infused into the surface of a flexible foam, such as a gel, water-based coatings, or solvent-based coatings.

Despite these efforts, there still remains a need to develop flexible foams, particularly polyurethane foams, latex foams, surface infused foams, coated foams, elastomer/gel foams, and the like having improved properties, such as greater indentation force deflection (IFD), greater static thermal conductivity, improved compression set, and/or improved height retention or durability, for better performance in any application use.

SUMMARY

There is provided, in a non-restrictive embodiment, a flexible foam composition comprising a polyurethane foam structure, where the polyurethane foam structure comprises a plurality of struts and a plurality of fibers, where a majority of the fibers are associated with the struts. Optionally the fibers are selected from the group consisting of carbon fibers, polymer fibers having a glass transition temperature (Tg) of –50° C. (–58° F.) or greater, homopolymer and/or copolymer fibers having a glass transition temperature (Tg) of or –50° C. (–58° F.) greater, plant-based fibers, animal-based fibers, metal fibers, and combinations thereof.

There is also provided, in another non-limiting embodiment, a flexible foam structure (optionally a polyurethane foam structure made by a process comprising reacting one or more polyols and one or more polyisocyanates in the presence of at least one gelation catalyst), where the flexible foam structure comprises a plurality of struts and a plurality of fibers, where a majority of the fibers are associated with the struts and are substantially parallel to their respective associated strut; and where the fibers are selected from the group consisting of carbon fibers, homopolymer and/or copolymer fibers having a glass transition temperature (Tg) of 50° C. (122° F.) or greater, polymer fibers having a glass transition temperature (Tg) of –50° C. (–58° F.) or greater, and combinations thereof. The fibers have a diameter between about 0.1 to about 25 microns, a length between about 30 to about 490 microns. In the case where the flexible foam is polyurethane foam, the foam has a fiber loading based on the amount of polyol ranges from about 0.01 to about 50 pph. In the case where the flexible foam is other than polyurethane foam, the fiber loading ranges from about 0.01 to 30 percent by weight in the final flexible foam.

Figure 1:
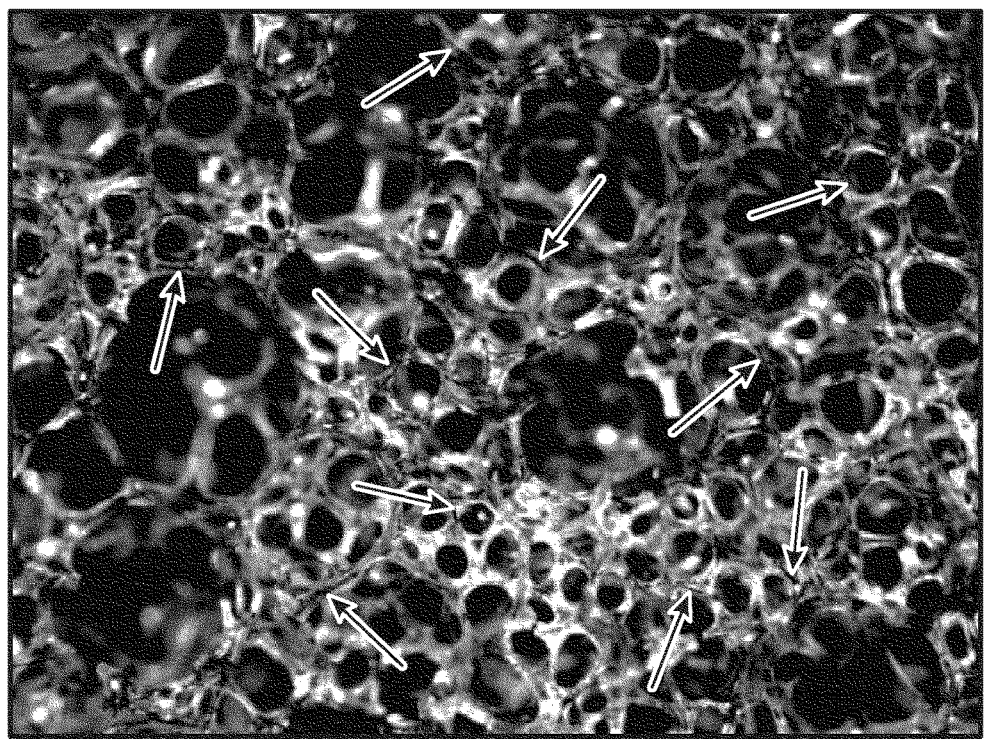
FIG. 1 is a microphotograph of a plurality of thermally conductive fiber-reinforced struts of in one non-limiting embodiment of a polyurethane foam composition discussed herein.

It will be appreciated that the various elements and details shown in photographic and graphic illustrations are not necessarily to scale or proportion, and that many details have been removed or simplified for clarity. Furthermore, this disclosure is not necessarily limited to the embodiments or details depicted or discussed in the Figures.

DETAILED DESCRIPTION

It has been discovered that fiber-reinforced polyurethane foam compositions that are made by loading an amount of fibers into the one or more polyols that reacts with one or more polyisocyanates in the presence of at least one gelation catalyst and other additives, such as gels including carbon fiber (CF) gels, results in a polyurethane foam that may have a greater indentation force deflection (IFD) as compared with an otherwise identical polyurethane foam composition absent the carbon fibers, may have a greater static thermal conductivity and/or improved height retention or durability as compared with an otherwise identical polyurethane foam composition absent the carbon fibers, and/or may have an improved compression set as compared with an otherwise identical polyurethane foam composition absent the carbon fibers. It has also been discovered that fibers may be included in a wide variety of flexible foam compositions to achieve one or more of these improvements. The methods and compositions herein do not relate to rigid foams. In one non-limiting embodiment, the fibers are mixed into a one or more liquid components of the reacting flexible foam formulation to make a pumpable slurry. In the case of flexible polyurethane foams, liquid components may comprise of any liquid component such as polyol, isocyanate, silicone surfactant, etc. conventionally used in the manufacture of polyurethane foams. Alternatively, there may be considered using a solids funnel or venturi effect and mixer in a trough after the foaming chemicals have been introduced through the mixhead but before gelation of the flexible foam.

In a non-restrictive embodiment, flexible foam composition comprises a flexible foam structure, where the flexible foam structure includes a plurality of struts and a plurality of fibers, where a majority of the fibers are associated with the struts. By "a majority" is meant greater than 50%, although in a non-limiting embodiment at least 60% of the fibers are associated with the struts, alternatively at least 70% of the fibers are so associated. As defined herein, flexible foam "struts" are an elastomer portion of a flexible foam that exist to form the cells. In a more specific non-limiting embodiment, struts are the elastomeric material between nodes. By "associated" is meant that a fiber is on and/or within the strut; that is, a fiber may be wholly within a strut, or may be only on the surface of the strut, or some combination of these positions. A fiber may protrude from a strut. Also within the structures defined herein are cases where a fiber, such as a reinforcing fiber, extends from one strut through a node and into another strut. In another non-limiting embodiment a majority of the fibers are substantially parallel to their respective associated strut. That is, if a strut is considered as linear or with a direction, the fiber is aligned with or substantially parallel thereto, in one non-limiting embodiment at least within 35° of a strut axis; alternatively at least within 25° of a strut axis; and in another non-restrictive embodiment at least within 15° of a strut axis. Various orientations of fibers on and within struts may be readily seen in the microphotographs of polyurethane flexible foam in FIGS. 1 and 2 herein.

The fibers that may be used to align with struts of the polyurethane foam structure and reinforce the polyurethane foam structure are, in a non-limiting embodiment, loaded into one or more polyols used to make the polyurethane foam structure, where fiber loading based on the amount of polyol could range from about 0.01 pph independently to about 50 pph; in another non-restrictive version from about 0.1 independently to about 30 pph; alternatively from about 0.25 independently to about 15 pph. The unit "pph" for purposes of this disclosure is defined to mean parts per hundred parts of polyol and reflects a measure of weight of a fiber that is added to every 100 of the same measure of weight of polyol used to make the foam. When the term "independently" is used herein with respect to a range, any threshold may be used together with any other threshold to give a suitable alternative range. For example in this case a suitable range is from about 0.01 pph to about 15 pph. In the case where the flexible foam is other than polyurethane foam, the fibers may be present in an amount of from about 0.01 independently to about 30 wt % of the final flexible foam; alternatively from about 0.5 independently to about 10 wt % of the final flexible foam. In a different non-restrictive version the fibers are thermally conductive fibers and the thermally conductive fiber loading is an amount effective to increase the static thermal conductivity as compared with an otherwise identical polyurethane foam composition absent the thermally conductive fibers. The amount of increase of static thermal conductivity may be at least 10%; alternatively at least 25%; and in another non-limiting embodiment at least 50%. Thermally conductive fibers are defined in one non-limiting embodiment as having a thermal conductivity of at least 1 W/m-K, alternatively at least 5 W/m-K, in another non-limiting version at least 20 W/m-K, alternatively at least about 100 W/m-K, or at least 250 W/m-K, even at least 500 W/m-K. The thermal conductivity of carbon fiber in epoxy in plane (as opposed to in transverse) is at least about 5-7 W/m-K. The thermal conductivity of carbon fiber is at least about 21-180 W/m-K. The thermal conductivity of high modulus mesophase pitch carbon fiber in the fiber direction is at least about 500 W/m-K. In a different non-limiting embodiment the fibers are non-thermally conductive or not very conductive; examples of non-thermally conductive fibers include, but are not necessarily limited to, natural fibers such as cotton, silk, and the like. As defined herein, carbon fibers do not include carbon nanotubes, do not include carbon black, and/or do not include activated carbon.

The fibers may be carbon fibers, and/or may be polymer fibers that have a glass transition temperature (Tg) of −50° C. (−58° F.) or greater; alternatively of 310K (99° F.) or greater; in another non-limiting embodiment a Tg of 323K (50° C. or 122° F.) or higher.

The polymer fibers may be and include homopolymers or co-polymers. Homopolymer and/or copolymer fibers suitable herein may have a glass transition temperature (Tg) of about 50° C. (122° F.) or greater. Suitable polymer fibers include, but are not limited to, fibers made from the polymers listed in Table 1 below.

In a non-restrictive embodiment, the fibers may have a diameter between about 0.1 microns independently to about 25 microns; in another non-restrictive version from about 2 microns independently to about 20 microns; alternatively from about 4 independently to about 12 microns; in a different non-limiting embodiment from about 1 micron independently to about 15 microns. The fibers may have a length in one non-limiting embodiment of between about 30 microns independently to about 490 microns; in another non-restrictive version between about 40 microns independently to about 390 microns; alternatively from about 50 to about 180 microns; in another non-restrictive version from about 90 to about 160 microns, and in still another non-limiting embodiment from about 75 to about 90 microns. In another non-restrictive embodiment, the fiber length is less than the average foam cell diameter. The average foam cell diameter may range from about 100 independently to about 3500 microns; alternatively from about 250 independently to about 1000 microns.

TABLE 1

Amorphous Polymers with Tg of 310° K (99° F.) or Greater

| Polymer Name | Tg (K) |
| --- | --- |
| Poly(p-phenylene terephthalamide), e.g. KEVLAR ®, PPTA | 600 |
| Poly(p-phenylene), PPP | 538 |
| Poly(m-phenylene terephthalamide), e.g. NOMEX ® MPDI | 537 |
| Poly(bisphenol S-alt-terephthalic acid) | 519 |
| Poly(methacrylic acid), PMAA | 501 |
| Poly(2,6,3',5'-tetrachloro bisphenol A carbonate) | 500 |
| Poly(2,6-diphenyl-p-phenylene oxide) | 497 |
| Poly(tetramethyl bisphenol A terephthalate) | 492 |
| Poly(1,4-phenylene ether-sulfone), PES | 490 |
| Poly(2,6-dimethyl-p-phenylene oxide), PPO | 487 |
| Poly(tetrachloro Bisphenol A terephthalate) | 483 |

TABLE 1-continued

Amorphous Polymers with Tg of 310° K (99° F.) or Greater

| Polymer Name | Tg (K) |
|---|---|
| Poly(1,4-biphenyl ether ether sulfone), PPSU | 482 |
| Poly(1,4-phenylene ether ether sulfone), PEE | 479 |
| Poly(bisphenol AP isophthalate) | 473 |
| Poly(tetramethyl Bisphenol A carbonate) | 467 |
| Poly(Bisphenol AP carbonate) | 460 |
| Poly{[bis(4-chlorophenyl)sulfone]-alt-[bisphenol-A]}, PSU | 457 |
| Poly(Bisphenol C terephthalate) | 445 |
| Poly(α-methylstyrene), PaMS | 445 |
| Poly(acrylamide) | 438 |
| Poly(ether ketone ketone), PEKK | 437 |
| Poly(methyl cyanoacrylate) | 436 |
| Poly{hydroquinone-alt-[1,4-bis(4-fluorobenzoyl)benzene]}, PEEKK | 433 |
| Poly(4-hydroxystyrene), PVAc, PVA | 430 |
| Poly(4,4'-dichlorobenzophenone), PEK | 428 |
| Poly(Bisphenol A carbonate) | 424 |
| Poly(4-phenylstyrene) | 423 |
| Poly(ethyl cyanoacrylate) | 422 |
| Poly[(hydroquinone)-alt-(4,4'-dichlorobenzophenone)], PEEK | 420 |
| Poly(Bisphenol E carbonate) | 416 |
| Poly(Bisphenol B carbonate) | 415 |
| Poly{(ethylene glycol)-alt-[bis(4-isocyanatophenyl)methane]}, EG 50 - MDI | 412 |
| Poly(4-bromostyrene) | 411 |
| Poly(2-methylstyrene) | 409 |
| Poly(diisopropyl Bisphenol A terephthalate) | 408 |
| Poly(4,4'-methylenedioxy dibenzoic anhydride) | 407 |
| Poly(Bisphenol F carbonate) | 407 |
| Poly(4-tert-butylcyclohexyl methacrylate) | 403 |
| Poly(4-tert-butylstyrene) | 402 |
| Poly(1,4-cyclohexanecarbonate) | 400 |
| Poly(4-chlorostyrene) | 398 |
| Poly(2-chlorostyrene) | 395 |
| Poly(cyclohexylethene) | 393 |
| Teflon, PTFE | 392 |
| Poly(ethylene 2,6-naphthalate) | 392 |
| Poly(4,4'-thiodiphenylene carbonate) | 391 |
| Poly(heptane-1,7-diyl terephthalamide) | 390 |
| Poly(cyclohexyl methacrylate) | 389 |
| Poly(tert-butyl methacrylate) | 388 |
| Poly(methacrylonitrile) | 388 |
| Poly(4-methoxystyrene) | 386 |
| Poly(vinyl phenyl sulfide) | 386 |
| Poly(isophthalic anhydride) | 385 |
| Poly(Bisphenol A terephthalate) | 385 |
| Poly(2-cyanobutyl acrylate) | 384 |
| Poly(isobornyl methacrylate) | 383 |
| Poly(phenyl methacrylate) | 383 |
| Poly(acrylonitrile), PAN | 383 |
| Poly(Bisphenol C carbonate) | 381 |
| Poly(N,N-dimethylacrylamide) | 379 |
| Poly(butyl cyanoacrylate) | 379 |
| Poly(methyl methacrylate), PMMA | 378 |
| Poly(4-methylstyrene) | 377 |
| Poly(4-fluorostyrene) | 376 |
| Poly(acrylic acid), PAA | 374 |
| Poly(diisobutyl Bisphenol A terephthalate) | 373 |
| Poly(dimethyl fumarate) | 373 |
| Poly(dimethyl itaconate), PDMI | 373 |
| Polystyrene, PS | 373 |
| Poly(3-methylstyrene) | 370 |
| Poly(methyl isopropenyl ketone) | 370 |
| Poly(3,3'-oxydiphenylene carbonate) | 364 |
| Poly(1,4-phenylene sulfide), PPS | 363 |
| Poly(1,4-phenyl ether), PPE | 361 |
| Poly(4-methoxy-2-methylstyrene) | 361 |
| Poly(chlorotrifluoroethylene) | 360 |
| Poly(4-isopropylstyrene) | 360 |
| Poly(isobornyl acrylate) | 359 |
| Poly(vinyl chloride), PVC | 356 |
| Poly(isopropyl methacrylate) | 356 |
| Poly(2-chloro-p-xylylene) | 356 |
| Poly(vinyl alcohol), PVOH, PVA | 353 |
| Poly(2-hydroxyethyl methacrylate), PHEMA | 350 |
| Poly(2-methoxystyrene) | 348 |
| Poly(2,2,2-trifluoroethyl methacrylate) | 347 |
| Poly(ethylene terephthalate) | 346 |
| Poly(2-hydroxypropyl methacrylate) | 345 |
| Poly(2,2,3,3-tetrafluoropropyl methacrylate) | 344 |
| Poly(vinyl benzoate) | 344 |
| Poly(vinyl butyral) | 344 |
| Poly(p-xylene) | 343 |
| Poly(ethyl methacrylate), PEMA | 338 |
| Poly[1-(tert-butyl)ethene] | 337 |
| Poly(4-chlorophenyl vinyl ketone) | 336 |
| Poly(glycidyl methacrylate) | 334 |
| Polylactic acid, PLA | 332 |
| Poly(isobutyl methacrylate) | 330 |
| Poly(2-ethyl-2-methylpropylene terephthalate) | 328 |
| Poly(trimethylene terephthalate) | 328 |
| Poly(benzyl methacrylate) | 328 |
| Poly(tetrahydrofurfuryl methacrylate) | 327 |
| Poly(vinyl fluoride), PVF | 326 |
| Poly(iminoadipoyliminoheptamethylene), Nylon 7,6 | 326 |
| Poly(iminosebacoyliminodecamethylene), Nylon 10,10 | 326 |
| Poly(4-ethylstyrene) | 326 |
| Poly(caprolactam), Nylon 6 | 324 |
| Poly(hexamethylene adipamide), Nylon 6,6 | 324 |
| Poly(8-aminooctanoic acid), Nylon 8 | 323 |
| Poly(phenyl vinyl ketone) | 323 |
| Poly(hexamethylene sebacamide), Nylon 6,10 | 320 |
| Poly(4,4'-pentamethylenedibenzoic anhydride) | 320 |
| Poly(vinyl stearate) | 318 |
| Poly(ω-undecanamide), Nylon 11 | 317 |
| Poly(4,4'-tetramethylenedibenzoic anhydride) | 316 |
| Poly(norbornene) | 316 |
| Poly(propyl methacrylate) | 316 |
| Poly(octadecyl acrylate) | 314 |
| Poly(ω-dodecanamide), Nylon 12 | 313 |
| Poly[(tetramethylene terephthalate) | 313 |
| Polyglycolide, PGL | 312 |
| poly[(prop-1-ene)-alt-(carbon monooxide)] | 312 |
| Poly(tert-butyl acrylate) | 311 |
| Poly(octadecyl methacrylate) | 311 |
| Poly(1,2-propylene carbonate), PPC | 310 |

In another non-limiting embodiment, suitable fibers include, but are not necessarily limited to, synthetic fibers, natural fibers, and/or metallic fibers. Suitable synthetic fibers include, but are not necessarily limited to, carbon, aramid, poly-para-phenylene terephthalamide, nylon, rayon, polytetrafluoroethylene (PTFE), polyester, polyacrylonitrile (PAN), the ones mentioned above in Table 1, and the like. Suitable natural fibers include, but are not necessarily limited to, fibers of animal-based origin, fibers of plant-based origin, and the like. More specifically, suitable animal-based fibers include, but are not necessarily limited to, collagen, keratin, chitin, cashmere, and the like. Suitable plant-based fibers include, but are not necessarily limited to, hemp, cellulose, bamboo, silk, coir (coconut fiber), abaca (banana fiber), cotton, and the like. One suitable non-limiting embodiment of poly-para-phenylene terephthalamide is KEVLAR® synthetic fiber available from DuPont, One suitable non-limiting embodiment of polytetrafluoroethylene is TEFLON® synthetic fluoropolymer available from Chemours.

In an non-restrictive version, the term metal fibers shall be taken to include an element or its oxides, compound, or alloy or combination thereof that exhibits good thermal conductivity defined as k>5 W/(m-° K), and may, but is not necessarily required to, exhibit good electrical conductivity, defined herein as a resistivity, $\rho<10^{-2}$ Ωm. As one non-limiting example, bronze is an alloy consisting primarily of copper along with tin and other metals in smaller quantities. Such alloys are encompassed herein in the definition of "metal fibers". Specific examples of suitable metal for the metal fibers may include, but are not necessarily limited to, lithium, sodium, potassium, rubidium, caesium, francium, beryllium, magnesium, calcium, strontium, barium, radium, zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium, aluminum, gallium, indium, tin, thallium, lead, bismuth, polonium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, lawrencium, meitnerium, darmstadtium, roentgenium, copernicium, nihonium, flerovium, moscovium, livermorium, germanium, arsenic, antimony, and combinations thereof. An alternative list of suitable metal fibers includes, but is not necessarily limited to, copper, titanium, brass, nickel, chrome, stainless steel, aluminum, as metal elements, as appropriate, and alloys thereof, oxides thereof, compounds thereof, and/or other combinations thereof.

In a different non-limiting embodiment, a "felted" foam may be made by incorporating low melt fibers into the polyurethane foam in addition to the thermally conductive fibers previously described. Felted foams are compressed foams that have taken a permanent set due the melted and fused fibers. Low melt fibers are defined as those having a melting point between 50° C. and 200° C. and having a Tg of −50° C. or greater; alternatively a Tg of 37° C. or greater, and in another non-restrictive version a Tg of 50° C. or greater. By additionally incorporating low melt fibers, foams having surface contouring and improved 3D shaping by melting low Tg fibers in situ to hold desired conformations while also generating greater strength may be obtained. Such foams would have low Tg zones and high Tg zones to produce both stable and thermoset foams.

In one non-limiting embodiment, the flexible foams herein have a specific density of greater than 0.5 pounds per cubic foot (pcf) (greater than 8 kg/m$^3$), alternatively from about 0.7 independently to about 10 pcf (from about 11 to about 160 kg/m$^3$), and in another non-restrictive version from about 0.9 independently to about 7 pcf (about 14 to about 112 kg/m$^3$).

In another non-limiting embodiment, the methods and compositions herein can include methods and compositions made by reaction injection molding (RIM). However, in a different non-restrictive version RIM is excluded from the present methods.

In still a different non-limiting embodiment, the flexible foams described herein may employ conventional blowing agents, including halogenated blowing agents. Nevertheless, in a different, non-restrictive version, the flexible foam compositions may have an absence of halogenated blowing agents.

In a different non-limiting embodiment, the fibers are not continuous, that is, they are chopped, cut, sliced, or otherwise have their length reduced. In another non-restrictive version, the flexible foam compositions only contain one type of fiber, that specified. The distribution of the fibers within the flexible foam composition may be random, homogeneous, and/or uniform. The fibers need not be uniformly oriented, although they may be. In other words, the fibers need not be oriented in a parallel orientation or any particular orientation, although they may be.

Table 2 shows a non-limiting list of exemplary polyurethane (PU) foam compositions of the type discussed herein and some PU foams without the fiber reinforcement described in this disclosure. Table 2 also displays performance data corresponding to the various foam compositions listed therein.

TABLE 2

Various PU Foam Compositions (with or without Fiber Reinforcement) and Performance Factor Results

| Foam | Flexible Fiber | pph Fiber | Wt % Fiber in Foam | Foam Type | Fiber Diam. micron | Fiber Length micron | Density lb/fts$^3$ | 25% IFD lbs |
|---|---|---|---|---|---|---|---|---|
| 1495 | N/A | 0.0 | 0.0 | Visco | 0.0 | 0.0 | 3.68 | 14.0 |
| 1873 | N/A | 0.0 | 0.0 | Visco | 0.0 | 0.0 | 3.41 | 9.5 |
| 1496 | Carbon Fiber C | 1.5 | 1.0 | Visco | 5.0 | 150 | 3.67 | 14.5 |
| 1497 | Carbon Fiber B | 1.5 | 1.0 | Visco | 7.0 | 150 | 3.71 | 15.2 |
| 1498 | Carbon Fiber A | 1.5 | 1.0 | Visco | 7.0 | 100 | 3.65 | 14.1 |
| 1499 | Carbon Fiber D | 1.5 | 1.0 | Visco | 7.0 | 100 | 3.65 | 16.8 |
| 1504 | Carbon Fiber E | 1.5 | 1.0 | Visco | 7.0 | 250 | 3.53 | 12.2 |
| 1505 | Carbon Fiber F | 1.5 | 1.0 | Visco | 7.0 | 150 | 3.54 | 11.5 |
| 1506 | Carbon Fiber G | 1.5 | 1.0 | Visco | 7.0 | 200 | 3.59 | 9.9 |
| 1528 | Carbon Fiber A | 1.0 | 0.6 | Visco | 7.0 | 100 | 3.52 | 9.9 |
| 1529 | Carbon Fiber A | 2.0 | 1.3 | Visco | 7.0 | 100 | 3.53 | 10.4 |
| 1530 | Carbon Fiber A | 4.0 | 2.6 | Visco | 7.0 | 100 | 3.60 | 12.2 |
| 1531 | Carbon Fiber A | 8.0 | 5.2 | Visco | 7.0 | 100 | 3.63 | 17.1 |
| 1532 | Carbon Fiber A | 1.0 | 0.6 | Visco | 7.0 | 100 | 3.60 | 9.0 |
| 1533 | Carbon Fiber A | 2.0 | 1.3 | Visco | 7.0 | 100 | 3.76 | 9.0 |
| 1534 | Carbon Fiber A | 2.0 | 1.3 | Visco | 7.0 | 100 | 3.57 | 9.3 |
| 1535 | Carbon Fiber A | 1.0 | 0.6 | Visco | 7.0 | 100 | 3.70 | 8.5 |
| 1874 | Carbon Fiber A | 5.0 | 3.2 | Visco | 7.0 | 100 | 3.54 | 13.1 |
| 1875 | Carbon Fiber A | 5.0 | 3.2 | Visco | 7.0 | 100 | 3.43 | 9.1 |
| 1965 | N/A | 0.0 | 0.0 | Conventional | 0.0 | 0.0 | 1.78 | 36.5 |
| 1966 | Carbon Fiber A | 1.0 | 0.6 | Conventional | 7.0 | 100 | 1.78 | 36.1 |
| 1967 | Carbon Fiber A | 3.0 | 1.9 | Conventional | 7.0 | 100 | 1.85 | 39.0 |
| 1968 | Carbon Fiber A | 5.0 | 3.2 | Conventional | 7.0 | 100 | 1.83 | 39.0 |
| 1978 | Carbon Fiber A | 3.0 | 1.9 | Conventional | 7.0 | 100 | 1.75 | 42.9 |
| 1979 | Carbon Fiber A | 5.0 | 3.2 | Conventional | 7.0 | 100 | 1.73 | 42.4 |

TABLE 2-continued

Various PU Foam Compositions (with or without Fiber Reinforcement) and Performance Factor Results

| Foam | Flexible Fiber | pph Fiber | Wt % Fiber in Foam | Foam Type | Fiber Diam. micron | Fiber Length micron | Density lb/fts$^3$ | 25% IFD lbs |
|---|---|---|---|---|---|---|---|---|
| C940 | N/A | 0.0 | 0.0 | Hybrid | 0.0 | 0.0 | 1.66 | 6.8 |
| C941 | Carbon Fiber A | 5.0 | 3.2 | Hybrid | 7.0 | 100 | 1.62 | 9.4 |
| 18-878 | N/A | 0.0 | 0.0 | Conventional | 0.0 | 0.0 | 1.91 | 41.1 |
| 18-660 | Carbon Fiber A | 1.5 | 1.0 | Conventional | 7.0 | 100 | 1.87 | 46.0 |
| 18-662 | N/A | 0.0 | 0.0 | Conventional | 0.0 | 0.0 | 1.77 | 45.3 |
| 18-663 | Carbon Fiber A | 2.3 | 1.5 | Conventional | 7.0 | 100 | 1.48 | 37.4 |
| 18-665 | N/A | 0.0 | 0.0 | Conventional | 0.0 | 0.0 | 1.45 | 39.4 |
| 18-909 | N/A | 0.0 | 0.0 | Conventional | 0.0 | 0.0 | 1.94 | 38.9 |
| 18-403 | N/A | 0.0 | 0.0 | Visco | 0.0 | 0.0 | 3.12 | 14.1 |
| 18-404 | N/A | 0.0 | 0.0 | Visco | 0.0 | 0.0 | 3.01 | 11.5 |
| T721 | N/A | 0.0 | 0.0 | Visco | 0.0 | 0.0 | 2.37 | 8.2 |
| T722 | Carbon Fiber A | 1.0 | 0.6 | Visco | 7.0 | 100 | 2.68 | 8.8 |
| T723 | Carbon Fiber A | 1.5 | 1.0 | Visco | 7.0 | 100 | 2.66 | 8.8 |
| T793 | N/A | 0.0 | 0.0 | Visco | 0.0 | 0.0 | 2.64 | 10.0 |
| T794 | Carbon Fiber A | 1.0 | 0.6 | Visco | 7.0 | 100 | 2.51 | 8.5 |
| T795 | Carbon Fiber A | 1.5 | 1.0 | Visco | 7.0 | 100 | 2.50 | 8.5 |
| 18-359 | Carbon Fiber A | 1.5 | 1.0 | Visco | 0.0 | 0.0 | 2.85 | 8.7 |
| L2405 | N/A | 0.0 | 0.0 | Conventional | 0.0 | 0.0 | 1.49 | 17.6 |
| L2420 | Carbon Fiber A | 0.5 | 0.3 | Conventional | 7.0 | 100 | 1.46 | 17.0 |
| L2406 | Carbon Fiber A | 1.0 | 0.6 | Conventional | 7.0 | 100 | 1.51 | 16.9 |
| L2421 | Carbon Fiber A | 1.5 | 1.0 | Conventional | 7.0 | 100 | 1.45 | 16.9 |
| L2407 | Carbon Fiber A | 2.0 | 1.3 | Conventional | 7.0 | 100 | 1.51 | 19.0 |
| L2408 | Carbon Fiber A | 3.0 | 1.9 | Conventional | 7.0 | 100 | 1.56 | 20.3 |
| L2409 | Carbon Fiber A | 5.0 | 3.2 | Conventional | 7.0 | 100 | 1.54 | 22.0 |
| L2375 | N/A | 0.0 | 0.0 | Conventional | 0.0 | 0.0 | 1.78 | 22.7 |
| L2422 | Carbon Fiber A | 0.5 | 0.3 | Conventional | 7.0 | 100 | 1.87 | 22.2 |
| L2376 | Carbon Fiber A | 1.0 | 0.6 | Conventional | 7.0 | 100 | 1.79 | 23.0 |
| L2423 | Carbon Fiber A | 1.5 | 1.0 | Conventional | 7.0 | 100 | 1.74 | 23.2 |
| L2377 | Carbon Fiber A | 2.0 | 1.3 | Conventional | 7.0 | 100 | 1.77 | 23.3 |
| L2378 | Carbon Fiber A | 3.0 | 1.9 | Conventional | 7.0 | 100 | 1.82 | 25.0 |
| L2379 | Carbon Fiber A | 5.0 | 3.2 | Conventional | 7.0 | 100 | 1.85 | 28.2 |
| L2415 | N/A | 0.0 | 0.0 | Conventional | 0.0 | 0.0 | 1.96 | 25.7 |
| L2424 | Carbon Fiber A | 0.5 | 0.3 | Conventional | 7.0 | 100 | 2.01 | 30.7 |
| L2416 | Carbon Fiber A | 1.0 | 0.6 | Conventional | 7.0 | 100 | 3.00 | 33.3 |
| L2425 | Carbon Fiber A | 1.5 | 1.0 | Conventional | 7.0 | 100 | 2.03 | 29.3 |
| L2417 | Carbon Fiber A | 2.0 | 1.3 | Conventional | 7.0 | 100 | 2.02 | 38.0 |
| L2418 | Carbon Fiber A | 3.0 | 1.9 | Conventional | 7.0 | 100 | 2.05 | 32.3 |
| L2419 | Carbon Fiber A | 5.0 | 3.2 | Conventional | 7.0 | 100 | 2.00 | 41.8 |
| L2410 | N/A | 0.0 | 0.0 | Conventional | 0.0 | 0.0 | 2.66 | 18.3 |
| L2426 | Carbon Fiber A | 0.5 | 0.3 | Conventional | 7.0 | 100 | 2.56 | 18.3 |
| L2411 | Carbon Fiber A | 1.0 | 0.6 | Conventional | 7.0 | 100 | 2.58 | 19.8 |
| L2427 | Carbon Fiber A | 1.5 | 1.0 | Conventional | 7.0 | 100 | 2.43 | 23.4 |
| L2412 | Carbon Fiber A | 2.0 | 1.3 | Conventional | 7.0 | 100 | 2.59 | 21.5 |
| L2413 | Carbon Fiber A | 3.0 | 1.9 | Conventional | 7.0 | 100 | 2.74 | 21.0 |
| L2414 | Carbon Fiber A | 5.0 | 3.2 | Conventional | 7.0 | 100 | 2.67 | 26.0 |
| L2538 | N/A | 0.0 | 0.0 | Visco | 0.0 | 0.0 | 3.09 | 9.2 |
| L2540 | Nickel Fiber | 5.0 | 3.2 | Visco | 8.0 | 200 | 3.15 | 10.7 |
| L2541 | Nickel Fiber | 5.0 | 3.2 | Visco | 2.0 | 200 | 3.13 | 9.5 |
| L2542 | Copper Fiber | 5.0 | 3.2 | Visco | 8.0 | 200 | 3.14 | 9.4 |
| L2584 | Chitosan Fiber | 5.0 | 3.2 | Visco | 0.0 | 0.0 | 3.09 | 8.9 |
| L2586 | Nickel Fiber | 1.0 | 0.6 | Visco | 8.0 | 200 | 3.05 | 9.0 |
| L2587 | Nickel Fiber | 1.0 | 0.6 | Visco | 2.0 | 200 | 3.02 | 8.3 |
| L2588 | Copper Fiber | 1.0 | 0.6 | Visco | 8.0 | 200 | 3.18 | 8.7 |
| L2589 | Chitosan Fiber | 1.0 | 0.6 | Visco | 0.0 | 0.0 | 3.30 | 13.1 |

To improve adhesion between the fiber and the flexible foam structure, in another non-limiting embodiment, the fibers may be surface treated. The surface treatment may be selected from the group consisting of dry oxidation in the presence of a gas selected from the group consisting of air, oxygen, $CO_2$, and combinations thereof; plasma etching; wet oxidation; deposition of an active form of carbon; wiskerization; plasma polymerization; grafting of polymers onto the fiber surface; sizing of the fibers with a material selected from the group consisting of epoxy, urethane, polyester, organic adhesives, gels, and combinations thereof; and combinations thereof. More particularly, suitable gels include, but are not necessarily limited to, hydrogels, gelatins, thermoplastic triblock and/or diblock gels as referenced in Peterson Chemical Technology LLC's U.S. Pat. No. 8,933,139 B1 incorporated herein by reference in its entirety, and the like. In one non-limiting embodiment, the surface treatment has an absence of silanes.

It will be appreciated that the polyols, polyisocyanates, and gelation catalysts can be those conventionally used for polyurethane flexible foams. Similarly, the components of the other flexible foam compositions mentioned herein may also be conventional. The flexible foam compositions may also contain useful amounts of conventionally employed additives such as stabilizers, antioxidants, antistatic agents, antimicrobial agents, ultraviolet stabilizers, phase change materials, surface tension modifiers such as silicone surfactants, emulsifying agents, and/or other surfactants, extender oils, solid flame retardants, liquid flame retardants, grafting polyols, compatible hydroxyl-containing chemicals which are completely saturated or unsaturated in one or more sites, solid or liquid fillers, antiblocking agents, colorants such as inorganic pigments or colorants, carbon black, organic colorants or dyes, reactive organic colorants or dyes, heat-responsive colorant, heat-responsive pigment, heat-responsive dye, pH-responsive colorant, pH-responsive pigment, pH-responsive dye and combinations thereof, fragrances, and thermally-conductive materials with thermal conductivity values in the range of 0.1 W/(m-° K) to 2000 W/(m-° K) such as talc, melamine, carbon black, graphite, aluminum oxide, aluminum nitride, zinc oxide, ferric oxide, diamond, titanium dioxide, magnesium oxide, magnesium silicate, silicon carbide, boron nitride, sodium carbonate, sodium bicarbonate, calcium carbonate, barium sulfate, metal flakes such as aluminum powder, and viscosity-modifiers such as fumed silica and clays, and other polymers in minor amounts and the like to an extent not affecting or substantially decreasing the desired properties of polyurethane foam herein.

The fiber reinforced flexible foam compositions and structures disclosed herein may be employed in many types of flexible foams including, but not limited to, open cell or closed cell; flexible polyurethane foam; polyether polyurethane foam; high-resiliency (HR) polyether polyurethane foam; flexible viscoelastic foam; flexible resilient polyurethane foam; flexible high resilient (HR) foam; viscoelastic polyether polyurethane foam; polyester polyurethane foam; latex foam; foamed polyethylene including low-density polyethylene (LDPE) foam, first grade of polyethylene (PE); foamed polypropylene including expanded polypropylene (EPP) and polypropylene paper (PPP); polystyrene (PS) foam, including expanded polystyrene (EPS), extruded polystyrene foam (XPS) and polystyrene paper (PSP); foamed silicone, melamine foam, ethylene-vinyl (EVA) foam, the copolymers of ethylene and vinyl acetate; also referred to as polyethylene-vinyl acetate (PEVA); nitrile rubber (NBR) foam, the copolymers of acrylonitrile (ACN) and butadiene; polychloroprene foam, also known as Neoprene; polyimide foam; and combinations thereof.

The foam compositions and foam structures disclosed herein may be used in the manufacture of a variety of articles such as, without limitation, rebond carpet pads, floor mats, bath mats, pet beds, shoe inserts, medical foams, mattresses, pillows, bedding products, seat cushions, seat backs, head rests, armrests and combinations thereof.

As discussed above, it has been discovered that flexible foam compositions disclosed herein may exhibit improved properties for performance.

Figure 2:
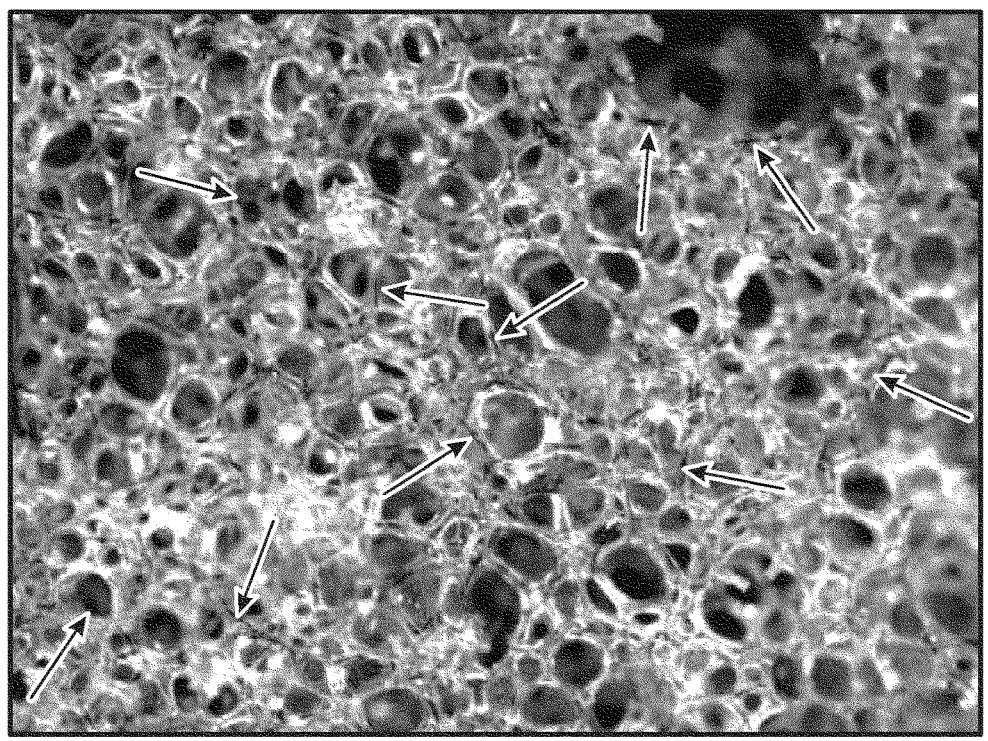
FIG. 2 is a microphotograph of a plurality of thermally conductive fiber-reinforced struts of in another non-limiting embodiment of a polyurethane foam composition discussed herein.

FIGS. 1 and 2 are microphotographs of a plurality of fiber-reinforced struts in different non-limiting embodiments of polyurethane foam compositions as described herein. Close examination will reveal that the polyurethane foam structures have conventional struts and that a plurality of carbon fibers is aligned with the struts, positioned on or within the struts. FIG. 1 is a microphotograph of a polyurethane foam made demonstrating mixing carbon fibers into the polyol side first, whereas FIG. 2 is a microphotograph of a polyurethane foam made demonstrating mixing carbon fibers by way of a concentrated slurry. In FIG. 1, some of the many fibers visible are pointed out by a few white arrows. In FIG. 2, some of the many fibers visible are pointed out by a few black arrows. In each microphotograph, many more fibers associated with struts are visible than are pointed out.

Figure 3:
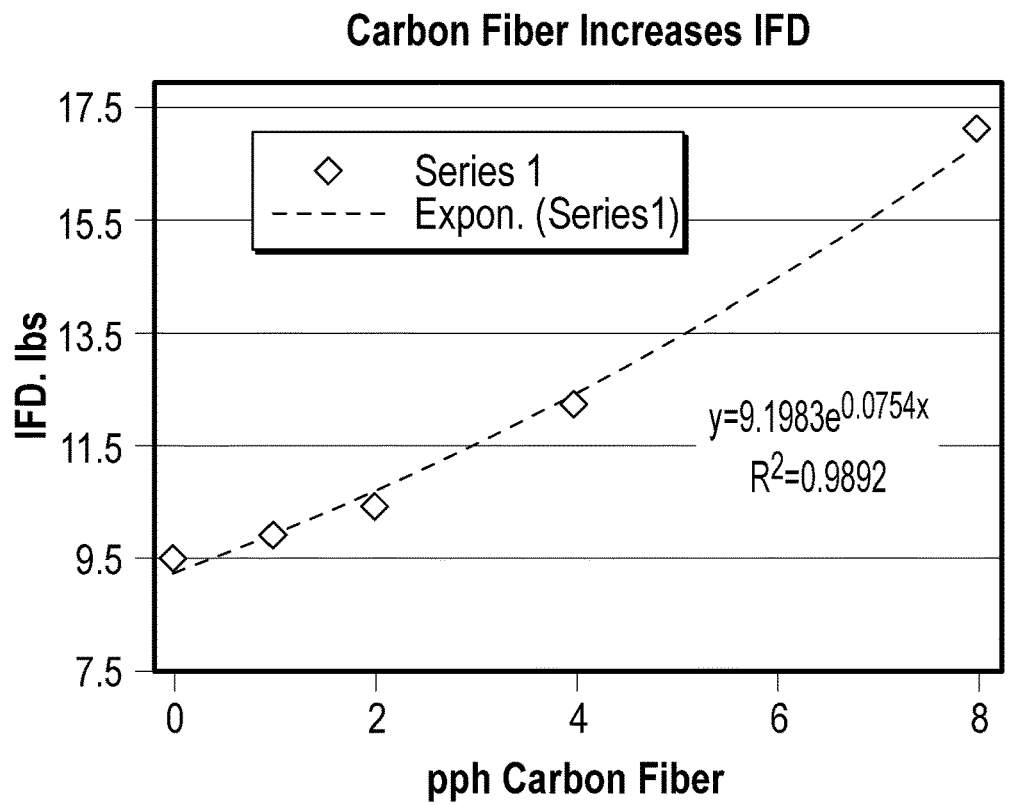
FIG. 3 is a graph illustrating the indentation force deflection (IFD) value of exemplary thermally conductive carbon-fiber reinforced polyurethane foams as described and discussed herein in relation to the amount of carbon fiber loaded into the polyol that is reacted to make the polyurethane foam.
Figure 4:
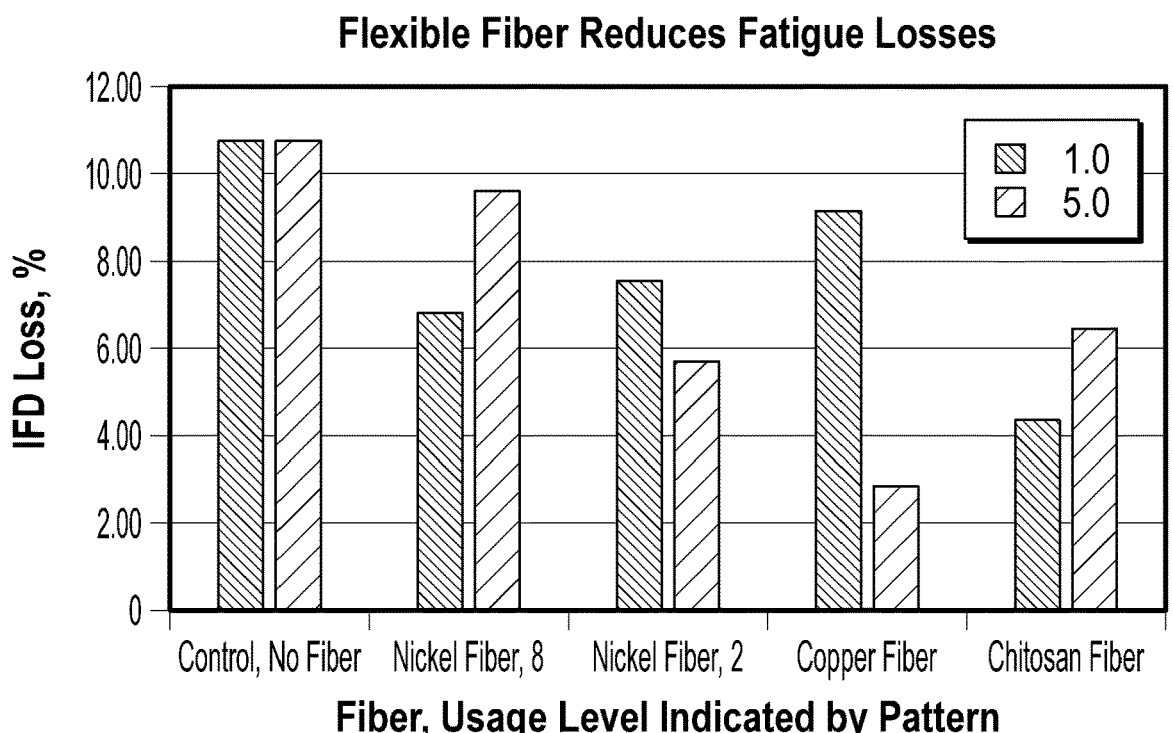
FIG. 4 is a bar graph illustrating that including flexible fiber reduces fatigue losses as measured by IFD for nickel fiber, copper fiber and chitosan fiber at two different usage levels, as described and discussed herein.
Figure 5:
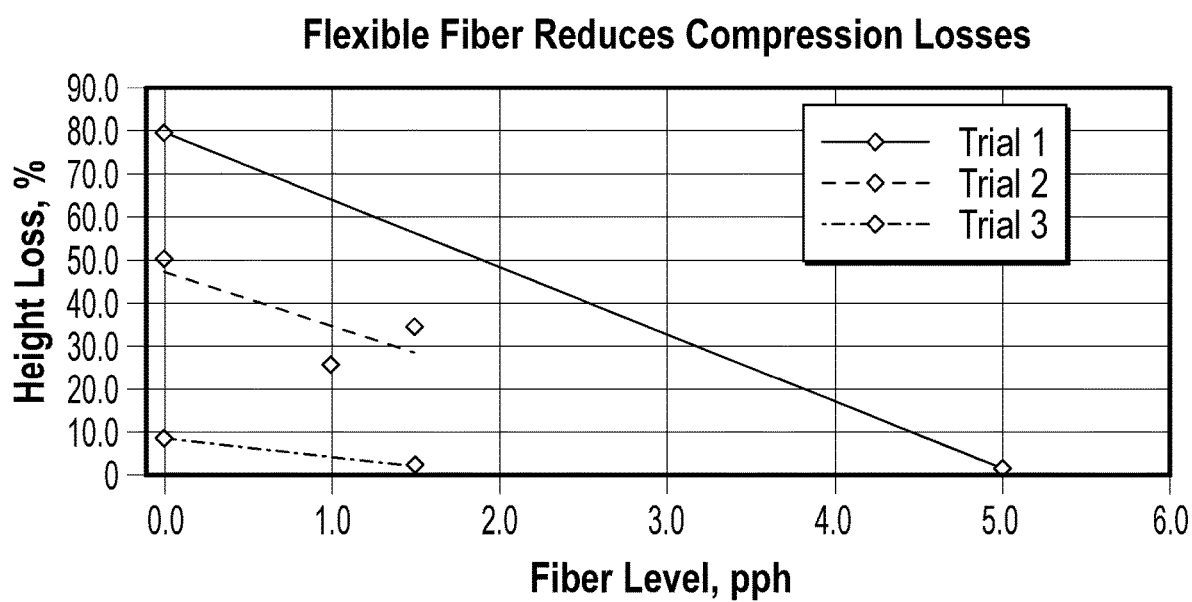
FIG. 5 is a graph illustrating that flexible fiber reduces compression losses as measured by height loss for three different trials with different fiber loadings into the polyol that is reacted to make the polyurethane foam.

As shown in FIGS. 3-5, polyurethane foam compositions that were made and tested that contained fibers displayed better IFD and compression losses than the polyurethane foam compositions that did not contain fibers. The IFD data were developed according to ASTM D3574 Test B1.

More specifically, FIG. 3 is a graph illustrating the IFD value of exemplary carbon-fiber reinforced polyurethane foams as a function of the amount of carbon fiber loaded into the polyol that is reacted to make the polyurethane foam. It is readily seen that the IFD increases with carbon fiber loading.

FIG. 4 is a bar graph illustrating that including flexible fiber reduces fatigue losses as measured by IFD for nickel fiber, copper fiber and chitosan fiber at two different usage levels reduces fatigue loss in all cases. FIG. 5 is a graph illustrating that flexible fiber reduces compression losses as measured by height loss for three different trials with different fiber loadings into the polyol that is reacted to make the polyurethane foam. Generally, as the amount of fiber level increases, the height loss is reduced.

Based on the data generated from the testing of exemplary embodiments of the flexible foam compositions described herein, the inclusion of fibers, e.g. thermally conductive fibers such as carbon fibers, appears to have an effect at increasing the IFD of and improving the compression losses of the foams, making the overall foams more rigid and thus firmer. In addition, the heat transfer effect seems to accelerate as the density of the carbon fiber in the foam increases. Finally, it appears that a strut reinforcement mechanism that may be created by the use of carbon fibers in the foam compositions may result in increased rigidity of the individual struts. This increases a foam's propensity to return to its original state after deformation and thus potentially improving compression set performance.

Many modifications may be made in the methods of and implementation of this invention without departing from the spirit and scope thereof that are defined only in the appended claims. For example, the exact foam-forming components, e.g. polyols, polyisocyanates, carbon fibers, gelation catalysts, polymer fibers and other additives, the proportions of these components used to make or treat the foams discussed herein used may be different from those used explicitly mentioned or suggested here. Additionally, techniques and methods for improving the properties and/or processing characteristics of polyurethane foam compositions and structures other than those specifically mentioned may find utility in the methods herein.

The words "comprising" and "comprises" as used throughout the claims is interpreted "including but not limited to".

The present invention may suitably comprise, consist or consist essentially of the elements disclosed and may be practiced in the absence of an element not disclosed. For instance, a flexible foam composition is provided that may consist of or consist essentially of: a flexible foam structure, where the flexible foam structure comprises, consists of, or consists essentially of a plurality of struts and a plurality of fibers, where the fibers are associated with the struts, and optionally where the fibers are selected from the group consisting of carbon fibers, polymer fibers having a glass transition temperature (Tg) of −50° C. (−58° F.) or greater, and combinations thereof.

In another non-limiting embodiment, there may be provided a flexible foam composition comprising, consisting essentially of, or consisting of a flexible foam structure, where the flexible foam structure comprises, consists of, or consists essentially of a plurality of struts and a plurality of thermally conductive carbon fibers, where a majority of the thermally conductive carbon fibers are associated with the struts and are substantially parallel to their respective associated strut, where the thermally conductive fiber loading is an amount effective to improve a property selected from the group consisting of increase static thermal conductivity, greater indentation force deflection (IFD), and/or improved height retention or durability, as compared with an otherwise identical flexible foam composition absent the thermally conductive carbon fibers. In a non-limiting embodiment as used herein, height retention is a measurement of dynamic fatigue.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "about" in reference to a given parameter is inclusive of the stated value and has the meaning dictated by the context (e.g., it includes the degree of error associated with measurement of the given parameter.

What is claimed is:

1. A flexible foam composition comprising:
   a flexible latex foam structure from a precursor comprising at least one liquid component, where the flexible foam structure comprises a plurality of open foam cells, each of which is surrounded by struts; and
   a plurality of fibers in substantial contact with the flexible latex foam structure, where a majority of the fibers in combination are wholly within a strut or on a surface of a strut and are substantially parallel to their respective associated strut such that the fibers are at least within 35° of the associated strut axis, a length of the fiber is less than an average foam cell diameter, the flexible foam structure has a foam density of about 0.7 to about 10 pounds per cubic foot (pcf), the fibers have a diameter between about 4 to about 12 microns, the fibers have a length between about 30 to less than 3500 microns, a plurality of foam cells span a thickness of the flexible foam structure, the fibers are present in the flexible foam composition in an amount from about 0.01 to about 30% by weight of the flexible foam composition, and wherein the fibers are randomly oriented within the flexible latex foam structure while other fibers are oriented in a substantially parallel direction within the flexible latex foam structure in an alignment relative to a thickness of the flexible latex foam structure.

2. The flexible foam composition of claim 1 where the fibers have a length between about 90 and about 490 microns.

3. The flexible foam composition of claim 1 where the fibers are thermally conductive fibers, and a thermally conductive fiber loading is an amount effective to increase the static thermal conductivity as compared with an otherwise identical flexible foam composition absent the fibers.

4. The flexible foam composition of claim 1 where the flexible foam structure comprises a fiber loading from about 0.5 to about 10% by weight of the flexible foam composition.

5. The flexible foam composition of claim 1 where the composition has a greater indentation force deflection (IFD) as compared with an otherwise identical flexible foam composition absent the fibers.

6. The flexible foam composition of claim 1 where the composition has an improved property as compared with an otherwise identical flexible foam composition absent the fibers, where the improved property is selected from the group consisting of:
   compression set,
   indentation force deflection (IFD),
   height retention,
   thermal conductivity, and
   combinations thereof.

7. The flexible foam composition of claim 1 where the fibers have been surface treated to improve adhesion between the fibers and the flexible foam structure, where the surface treatment is selected from the group consisting of:
   dry oxidation in the presence of a gas selected from the group consisting of air, oxygen, $CO_2$, and combinations thereof;
   plasma etching;
   wet oxidation;
   deposition of an active form of carbon,
   wiskerization,
   plasma polymerization,
   grafting of polymers onto the fiber surface,
   sizing of the fibers with a material selected from the group consisting of epoxy, urethane, polyester, organic adhesives, gels, and combinations thereof; and
   combinations thereof.

8. The flexible foam composition of claim 1 where the fibers are selected from the group consisting of:
   synthetic fibers selected from the group consisting of carbon, aramid, poly-para-phenylene terephthalamide, nylon, rayon, polytetrafluoroethylene (PTFE), polyester, and polyacrylonitrile (PAN);
   fibers of animal-based origin;
   fibers of plant-based origin;
   metal fibers selected from the group consisting of metal elements, oxides thereof, compounds thereof, alloys thereof, and combinations thereof; and
   combinations thereof.

9. The flexible foam composition of claim 1 where:
   fibers of animal-based origin are selected from the group consisting of collagen, keratin, chitin, silk, and combinations thereof; and
   fibers of plant-based origin are selected from the group consisting of hemp, cellulose, bamboo, coir (coconut fiber), abaca (banana fiber), and cotton.

10. The flexible foam composition of claim 1 where the fibers are selected from the group consisting of homopolymer and/or copolymer fibers having a glass transition temperature (Tg) of −50° C. (−58° F.) or greater, carbon fibers, and combinations thereof.

11. The flexible foam composition of claim 1 additionally comprising a plurality of low melt fibers having a melting point between 50° C. and 200° C. and having a Tg of −50° C. or greater and where the flexible foam composition is a felted foam.

12. The flexible foam composition of claim 1 where the fibers are carbon fibers.

13. The flexible foam composition of claim 1 where the fibers are thermally conductive fibers having a thermal conductivity of at least 1 W/m-K.

14. An article of manufacture comprising the flexible foam composition of claim 1 where the article is selected from the group consisting of rebond carpet pads, floor mats, bath mats, pet beds, shoe inserts, medical foams, mattresses, pillows, bedding products, seat cushions, seat backs, head rests, armrests and combinations thereof.

15. The flexible foam composition of claim 1 wherein the fibers are at least within 25° of the associated strut axis.

16. The flexible foam composition of claim 1 wherein the fibers are at least within 15° of the associated strut axis.

17. A flexible foam composition comprising:
a flexible latex foam structure, where the flexible foam structure comprises a plurality of open foam cells, each of which is surrounded by struts, the flexible foam structure has a specific density of about 0.9 to about 7 pounds per cubic foot (pcf), an average foam cell diameter is about 250 to about 3500 microns and a plurality of foam cells span a thickness of the flexible foam structure; and
a plurality of fibers in substantial contact with the flexible latex foam structure, where a majority of the fibers in combination are wholly within a strut or on a surface of a strut and are substantially parallel to their respective associated strut such that the fibers are at least within 35° of the associated strut axis, where the fibers are selected from the group consisting of carbon fibers, homopolymer and/or copolymer fibers having a glass transition temperature (Tg) of −50° C. (−58° F.) or greater, and combinations thereof;
where:
the fibers have a diameter between about 4 to about 12 microns;
the fibers have a length between about 30 to less than 3500 microns and a majority of the fibers are not extending through the struts to connect at least one foam cell to another;
fiber loading from about 0.5 to about 10% by weight of the flexible foam composition, and wherein the fibers are randomly oriented within the flexible latex foam structure while other fibers are oriented in a substantially parallel direction within the flexible latex foam structure in an alignment relative to a thickness of the flexible latex foam structure.

18. The flexible foam composition of claim 17 where the fibers are thermally conductive fibers having a thermal conductivity of at least 1 W/m-K and the fiber loading is an amount effective to increase the static thermal conductivity as compared with an otherwise identical flexible foam absent the fibers.

19. The flexible foam composition of claim 18 where the thermally conductive fibers have been surface treated to improve adhesion between the thermally conductive fiber and the flexible foam structure, where the surface treatment is selected from the group consisting of:
dry oxidation in the presence of a gas selected from the group consisting of air, oxygen, $CO_2$, and combinations thereof;
plasma etching;
wet oxidation;
deposition of an active form of carbon,
wiskerization,
plasma polymerization,
grafting of polymers onto the thermally conductive fiber surface,
sizing of the thermally conductive fibers with a material selected from the group consisting of epoxy, urethane, polyester, organic adhesives, gels, and combinations thereof; and
combinations thereof.

20. The flexible foam composition of claim 18 where the thermally conductive fibers are carbon fibers.

21. The flexible foam composition of claim 17 where a foam property is improved as compared with an otherwise identical flexible foam composition absent the fibers, where the improved property is selected from the group consisting of:
indentation force deflection (IFD);
compression set;
height retention; and
combinations thereof.

22. The flexible foam composition of claim 17 wherein the fibers are at least within 25° of the associated strut axis.

23. The flexible foam composition of claim 17 wherein the fibers are at least within 15° of the associated strut axis.

* * * * *